Jan. 2, 1968  F. A. WAGNER  3,361,122
VARIABLE VALVE TIMING MECHANISMS
Filed Feb. 9, 1967  5 Sheets-Sheet 5
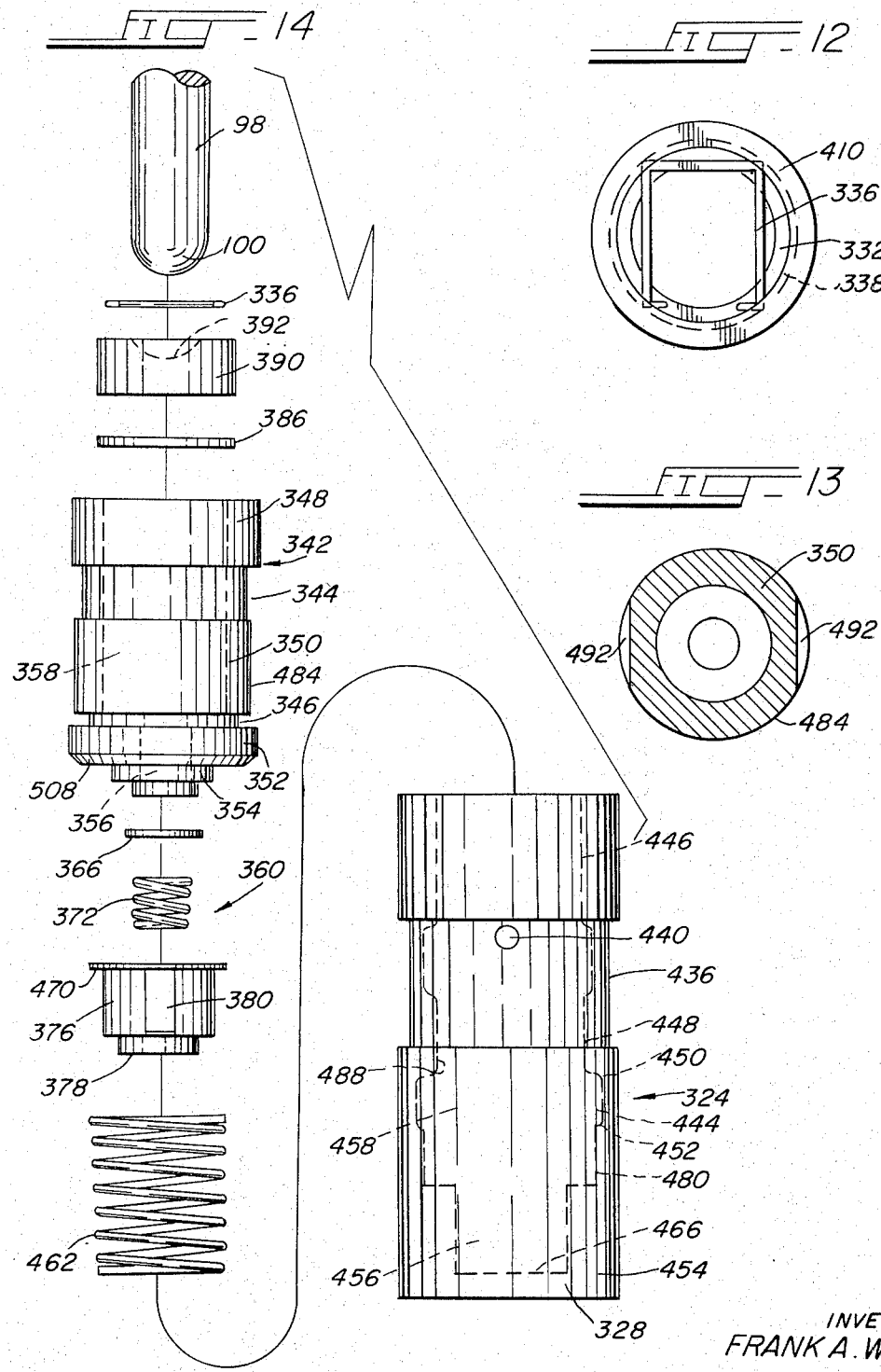
INVENTOR
FRANK A. WAGNER
BY Kegan, Kegan & Berkman
Att'ys.

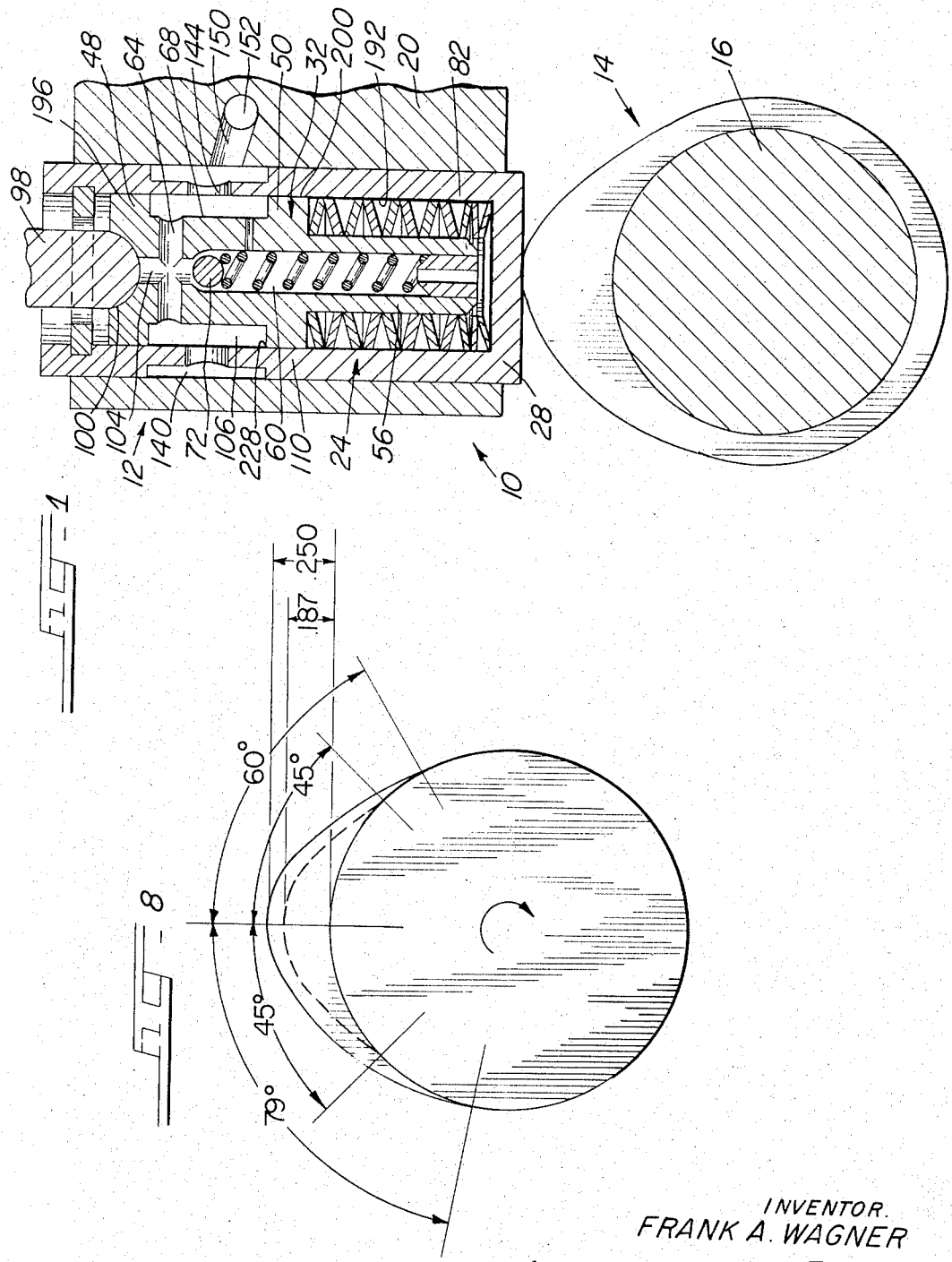

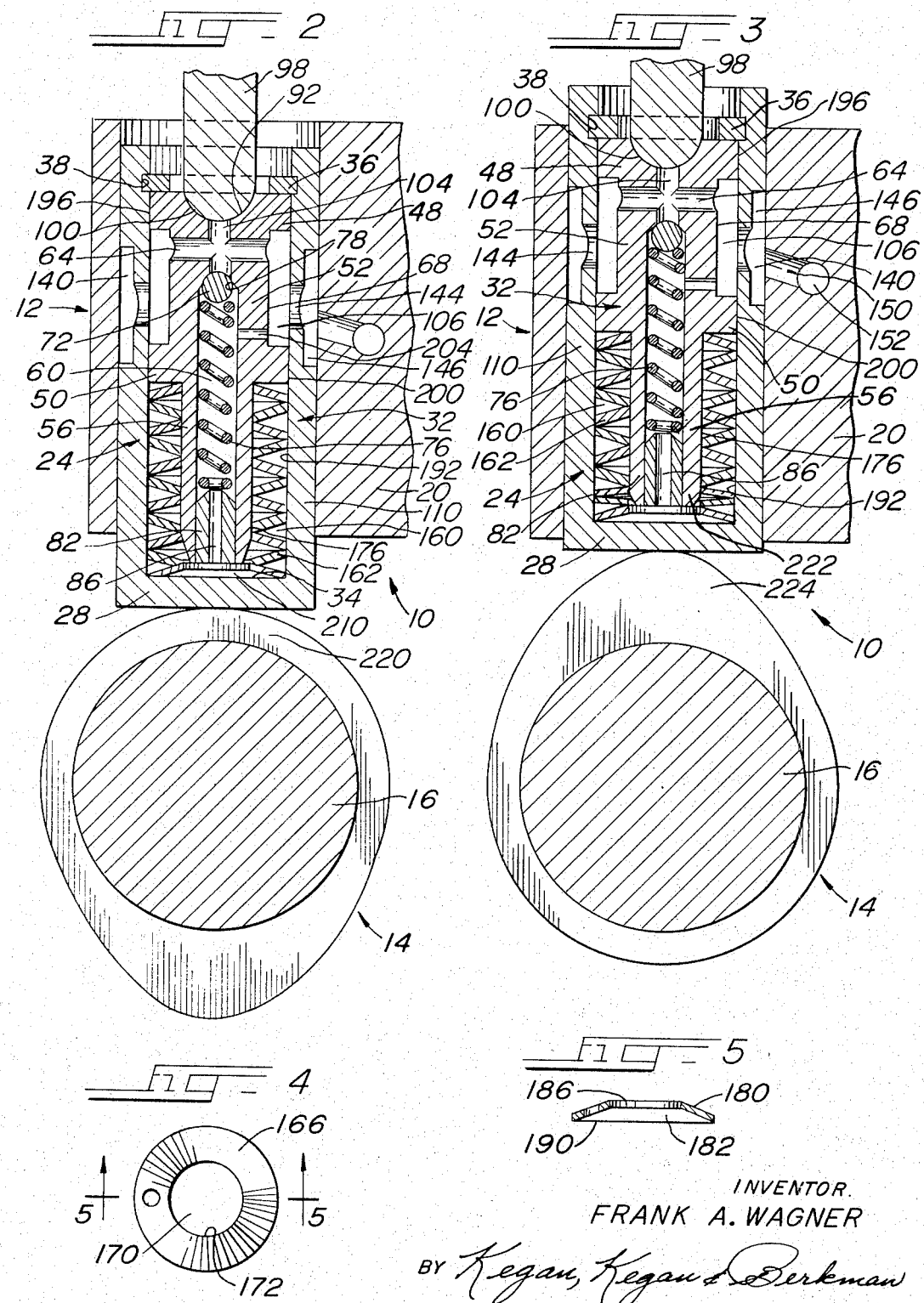

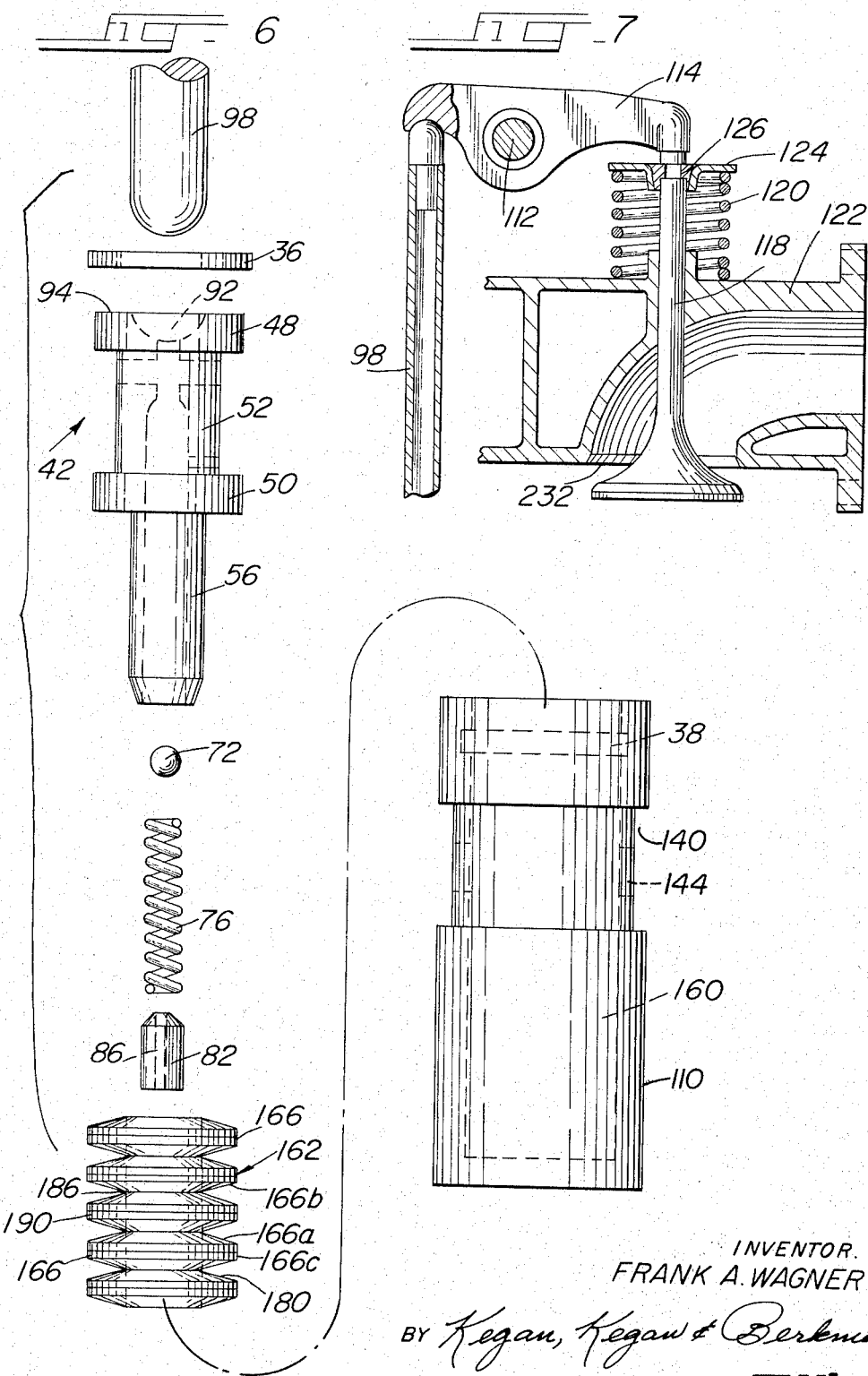

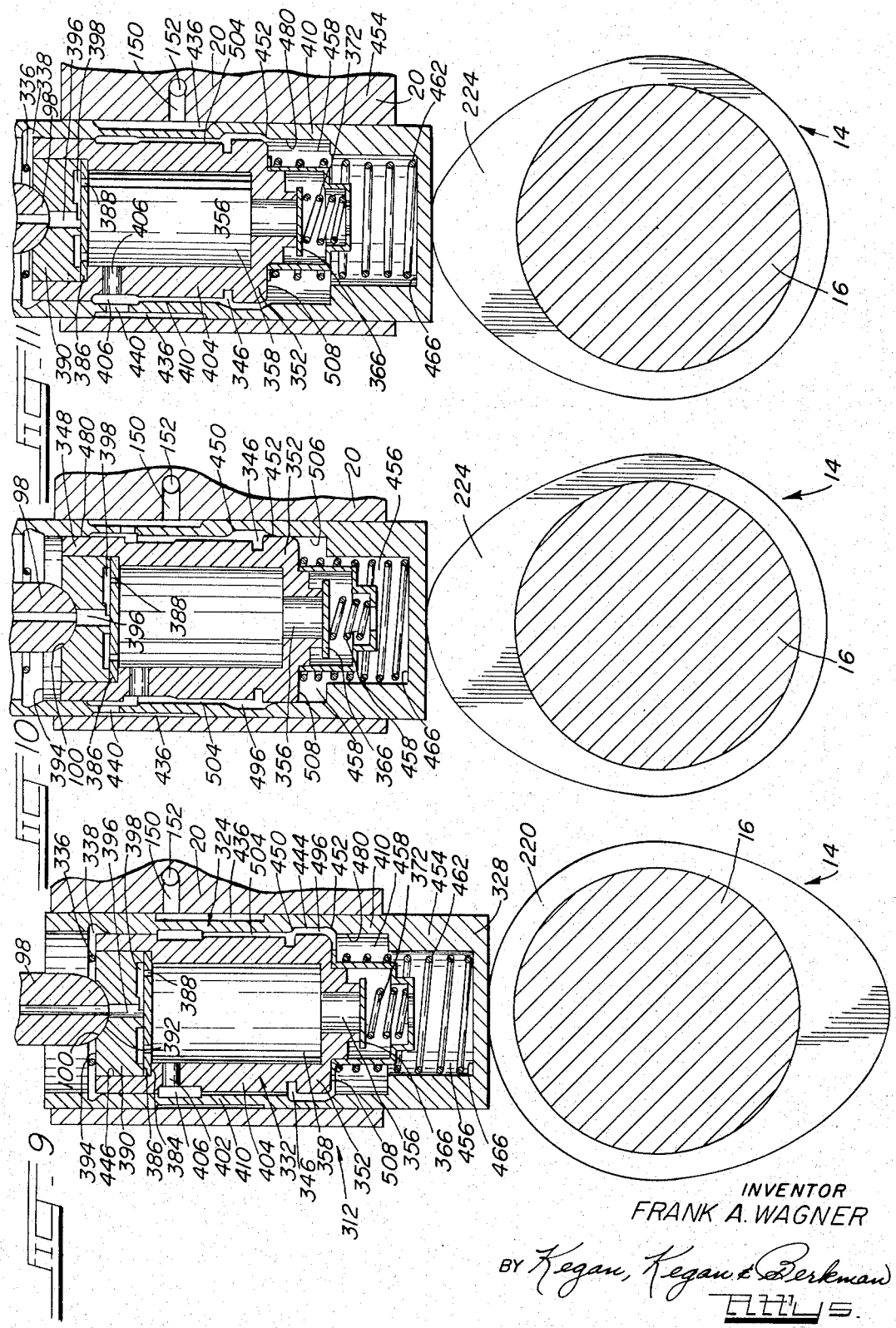

United States Patent Office 3,361,122
Patented Jan. 2, 1968

3,361,122
VARIABLE VALVE TIMING MECHANISMS
Frank A. Wagner, Chicago, Ill., assignor to Wagner-Jordan Inc., a corporation of Illinois
Filed Feb. 9, 1967, Ser. No. 625,890
24 Claims. (Cl. 123—90)

ABSTRACT OF THE DISCLOSURE

Hydraulic double lifter variable valve timing assemblies for regulating the opening and closing of intake and exhaust valves of internal combustion engines, each assembly including a pair of fluid-coupled hydraulic lifters disposed coaxially for relative reciprocal telescoping movement in response to a single lobe cam bearing against and controlling movement of one of said lifters, the degree of fluid coupling between the two lifters and, thus, the timing of and extent of lifting by the lifters being a function of engine speed to provide optimum valve operation at any given engine speed.

---

This application is a continuation-in-part of co-pending application Ser. No. 544,153, filed Apr. 21, 1966, now abandoned, which is a continuation-in-part of application Ser. No. 478,230, filed Aug. 9, 1965, now Patent No. 3,277,874, granted Oct. 11, 1966; and the present invention relates generally to improvements in variable valve timing mechanisms finding utility in internal combustion engines. More particularly, the invention is directed to engine-speed-controlled hydraulic mechanisms for operating the exhaust and intake valves of such engines.

It is well known to those skilled in the art to which this invention relates that valve timing is very important in achieving maximum engine efficiency, and that valve timing specially suited for high engine speeds is not the best timing for low engine speeds. It is, therefore, the aim of the present invention to provide a variable valve timing mechanism of improved and simplified structure which will operate automatically to open and close the valves of an internal combustion engine in a manner to ensure maximum operating efficiency at low speeds, high speeds, and at intermediate speeds.

It is a principal object of the invention to provide an automatically operable engine-speed-controlled, hydraulic variable valve timing mechanism which is operative to vary the valve timing as a function of engine speed and to provide smooth operation and maximum efficiency over the entire operating speed range of the engine.

Another object of the invention is to provide a novel combination of a single lobed cam with a double hydraulic lifter assembly to vary the valve timing automatically as a function of engine speed while providing maximum operating efficiency over the complete operating speed range of the internal combustion engine.

Still another object of the invention is to provide improved hydraulic coupling means for interconnecting two lifters of a valve lifter assembly, in which assembly the degree or extent of coupling is a function of engine speed.

A related object of the invention is to provide a double lifter element valve control mechanism functioning in combination and cooperation with an improved spring means to bias the two lifter elements to given relative positions.

Yet another object of the invention is to provide an improved automatic variable valve timing mechanism in which compression forces applied to a novel spring of the mechanism are controlled through fluid porting means which regulate the fluid coupling between the two lifter elements of the assembly.

Another object of the invention is to provide a hydraulically controlled valve timing mechanism which includes a pair of spring-stressed lifter elements, a fluid chamber, and porting means which automatically cooperate to control oil passage into and from the chamber, to control the degree of fluid coupling of the two lifter elements and to vary this coupling as a function of engine speed, thereby to provide optimum valve timing at any given engine speed.

A related object of the invention is to provide a hydraulically-controlled variable valve timing mechanism for internal combustion engines in which the compression-opposing properties of a compression-resisting spring, in cooperation with fluid coupling and porting means, precludes substantial spring compression at high engine speeds while permitting compression at lower engine speeds.

Yet another object of the invention is to provide an improved variable valve timing mechanism including an outer lifter and an inner lifter and in which the inner lifter is axially reciprocal within the outer lifter but within precisely controlled longitudinal limits, one limit defining a position assumed only at low engine speeds and another limit defining a position assumed at high engine speeds, and in which the positioning is variable infinitely between the two extremes.

It is an important object of the invention to provide in an internal combustion engine a variable valve timing mechanism utilizing but a single cam lobe, but automatically regulated, through cooperating spring forces and fluid portings, to provide valve opening and timing which is precisely a function of and directly related to engine speeds.

Still another object of the invention is to provide an improved variable valve timing mechanism including a pair of fluid-coupled inner and outer lifters in relatively reciprocal disposition and arranged to obviate mechanical bottoming of the inner on the outer lifter.

A related object of the invention is to eliminate objectional engine noises associated with the physical, mechanical contacting of moving valve lifting elements.

Other and further objects, aims and advantages of the invention will become apparent from a reading of the following specification taken in conjunction with the drawings in which:

FIGURE 1 is a semi-schematic illustration of the lifter assembly and cam of one embodiment of the invention with parts broken away and in section and illustrating the mechanism of the lifters in position during slow engine speed, the internal lifter being pictured at a position assumed at maximum height or lift of the cam;

FIGURE 2 is a view similar to that depicted in FIGURE 1 but showing the internal valve lifter in the position assumed at minimum height or lift of the cam lobe;

FIGURE 3 is a view similar to that illustrated in FIGURE 1 but indicating the position of the inner lifter assumed at high engine speeds and at maximum lift height of the cam lobe;

FIGURE 4 is a top plan view of a cone-shaped spring washer element of the improved spring mechanism of one embodiment of the valve lifter assembly;

FIGURE 5 is a cross-sectional view taken substantially on the line 5—5 of FIGURE 4;

FIGURE 6 is an exploded view of the component elements of the valve lifter assembly of the valve timing mechanism of one embodiment of the invention;

FIGURE 7 is a schematic representation of the linkage between a push rod actuated through the mechanism of the invention, and a valve assembly; and FIGURE 8 is a schematic representation of a sector diagram showing, in reference to different angular positions of the engine of crank shaft, the times of opening and closing of an exhaust valve, expressed in degrees pertaining to the valve timing and indicating the effective lifting height and pattern at high and low engine speeds.

FIGURES 9 through 14 illustrate a second embodiment of the invention in which the same basic inventive concepts are relied upon, but which utilizes a modified fluid channeling and flow control arrangement comprising a novel combination of hydraulic and mechanical elements to obviate mechanical seating, abutment, or striking of the inner lifter against the outer lifter.

FIGURE 9 is a semi-schematic illustration of a lifter assembly and cam with parts broken away and in section and illustrating the mechanism of a second embodiment of the invention with the internal valve in the position assumed at minimum height or lift of the cam lobe;

FIGURE 10 is a view similar to that depicted in FIGURE 9 but showing the internal valve lifters in position during slow engine speeds;

FIGURE 11 is a view similar to that illustrated in FIGURE 10 but indicating the position of the inner lifter assumed at high engine speeds and at maximum lift height of the cam lobe;

FIGURE 12 is a top plan view of the valve lifter assembly shown in FIGURE 9;

FIGURE 13 is a horizontal cross-sectional view of the inner lifter of the embodiment of the invention illustrated in FIGURE 9, taken substantially on the line 13—13 of FIGURE 9; and FIGURE 14 is an exploded view of the component elements of the valve lifter assembly of the valve timing mechanism of the embodiment of the invention shown in FIGURE 9.

The present invention represents an improvement over earlier filed co-pending application Ser. No. 478,230, now U.S. Patent No. 3,277,874, and the disclosure of that application is incorporated herein by reference to the extent it is not inconsistent herewith. In the present invention, the variable valve timing is achieved, as set forth hereinafter, through the use of a single lobed cam in contact with a single lifter element. In accordance with the practice of the present invention the valves and valve-actuating elements coact and cooperate to attain, in a greatly simplified manner, optimum valve cycling over a broad range of engine speeds.

The present invention is not limited in its applicability to any particular internal combustion engine but is generally useful in all such types of engines including overhead valve engines and engines in which the valves are located in the block. The invention also finds utility in engines in which the valve-operating cam shaft is disposed adjacent or over the cylinder head.

For purposes of illustrative disclosure, and not by way of limitation, the operation of the improved variable timing mechanism of the invention will be described herein with reference to an engine having overhead valves, as illustrated schematically in FIGURE 7. The engine itself may be considered conventional and includes a core or block in which the cylinders are provided, pistons which are reciprocally received within the cylinder, and cylinder heads fitted with suitable intake and exhaust valves.

For optimum engine operation and for maximum power and smoothness different valve programming is required under differing conditions. At slower engine speeds, or at idling speeds, the intake valve should preferably open as the piston reaches top dead center, and should remain open until the piston reaches bottom dead center. Such operation ensures full intake of air and fuel mixtures. At the same time, exhaust valves should not open until the power stroke is completed and the piston reaches bottom dead center. The exhaust valve should then remain open until the piston returns to top dead center, thus completing the cycle.

At high engine speeds a different valve timing cycle is desirable in order to achieve maximum efficiency and power output. Intake valves must open sooner and close later, since the high velocity of air and fuel rushing into the combustion chamber will cause such air and fuel to continue to enter the chamber even after the piston has passed the bottom dead center. At higher engine speeds the exhaust valve is preferably timed to open considerably before the piston reaches the bottom dead center, or prior to completion of the power stroke, and remains open until the piston has passed the top dead center point. It thus becomes possible to scavenge the combustion gases from the combustion chamber. In general, the higher the engine speed, the greater is the fraction of the cycle time during which the valves should be retained open.

However, engines with valves timed for high speed operation will not operate satisfactorily at lower speeds. For example, at low engine speeds the opening of the intake valve at a position before top dead center is reached will cause exhaust gases to be discharged through the intake port. Moreover, as the piston passes bottom dead center, it will push out a portion of the intake mixture, thus reducing the overall effective charge. In a similar manner, the premature opening of the exhaust valve robs the engine of a full power stroke, and the overextended open period of the valve reduces the intake charge. An additional objectionable feature is that carbonization of the combustion chamber and of the intake valve will occur. Thus, an engine with a predetermined valve timing will give satisfactory performance only within a given limited speed range.

In a typical low speed timing cycle there is relatively small time overlap of the exhaust and intake valves. In contrast, in a timing cycle for high speed engine operation the periods of opening exhaust valves and intake valves are much greater as is the overlap of the open periods of these valves. It is possible through the present invention to obtain the advantages of both low speed and high speed timing, and of intermediate timing, in a single internal combustion engine having a single camming lobe, thus enabling the engine to operate efficiently and at maximum power over a wide range of engine speeds.

The aims and object of the invention are accomplished by providing in an automatic variable valve timing mechanism a single lobed cam in combination with an improved double lifter assembly, the lifters of the assembly being disposed in telescoping relationship and being coupled, variably, through a fluid medium. The extent of coupling or interlocking of the two lifters is a function of fluid porting which is in turn a direct function of engine speed. At relatively high engine speeds no appreciable oil volume is discharged from the fluid cavity between the lifters so that the lifter elements become "locked" together through the incompressible column of oil in the chamber. In this locked position, the inner lifter is displaced upwardly with respect to the base of the outer lifter through the interaction and cooperation of novel spring elements and fluid porting means whereby, in effect, a greater degree of lifting is realized at the higher engine speeds. At low engine speeds there is adequate time during the camming cycle for fluid to escape from within the chamber between the two lifter elements so that the inner lifter approaches closer to the base of the outer lifter to provide, in effect, a "shorter" lifter element. At intermediate speeds, the actual lifting will be a composite or hybrid of the two above-described modes of operation. Thus, for any particular engine speed, optimum conditions of efficiency and power are realized.

The present invention is described herein with reference to two specific preferred embodiments, the first embodiment being illustrated in and described with reference to FIGURES 1 through 8, and structural features specific to the second embodiment being described with reference to FIGURES 9 through 14. Each embodiment finds utility in the same types of engines; each mechanism includes a single lobed cam, a dual element valve lifter, and a novel combination of cooperating mechanical and hydraulic valve lifter control structures. The invention will be described first with reference to the embodiment shown in FIGURES 1 through 8.

Referring more particularly to the drawings, there is shown in FIGURES 1, 2 and 3, for the purpose of illustrative disclosure, a preferred embodiment of the variable valve timing mechanism of the invention, incorporating the teachings thereof. The timing mechanism 10 includes a double lifter assembly 12 and a cam 14, the latter being fixed on a cam shaft 16 for rotation therewith.

The double lifter assembly 12, shown in detail in FIGURES 1 through 3 and depicted in the exploded view, FIGURE 6, is slidably disposed for reciprocating action in a fixed body or block 20. The lifter assembly 12 itself includes a generally cylindrically shaped outer lifter 24 having a base wall or floor 28 which is normally supported on and rides on the cam 14. An inner lifter 32 is coaxial with and slidably supported within the outer lifter 24. The inner face 34 of the base wall or floor 28 constitutes a lower stop for the inner lifter and a ring 36 carried in an internal annular groove or recess 38 near the upper end of the outer lifter serves as an abutment or stop for the inner lifter 32 during its upward travel.

Referring more particularly to the inner lifter 32, in the first preferred embodiment of the invention illustrated, the inner lifter comprises a spool-like spindle 42 generally cylindrical in shape and provided with axially spaced upper and lower flanges 48 and 50 integrally formed with the body portion 52 of the spool 42. Coaxial with and integrally formed with the body portion 52 of the inner lifter 32 and extending downwardly of the flanges 48 and 50 is a shaft 56 integral with the spindle 42 and formed with an axially extending slot or cavity 60. At its upper end the slot 60 communicates with a transversely extending bore 64 which opens on a vertical wall 68 of the spool body 52.

The inner lifter 32 is provided with a check valve assembly comprising a ball 72 and a spring 76 housed in the slot 60, the spring urging the ball into sealing engagement with a seat 78 formed in the upper portion of the slot 60, as clearly shown in FIGURE 2. A plug 82 inserted into the lower end of the slot 60 holds the spring 76 in place and under tension. The plug 82 has a through axial port or bore 86 providing fluid communication between the slot 62 of the inner lifter and the outside.

The head portion 48 of the inner lifter 32 is formed with a socket 92 extending axially inwardly of the top surface 94 of the lifter 32 for receiving in supporting engagement a push rod 98. Lubrication at the rounded base 100 of the push rod 98 is provided through a passage 104 in the head 48 of the inner lifter and communicating with an annular passage 106 formed between the wall 68 of the inner lifter 32 and the facing side wall 110 of the outer lifter, as clearly shown in FIGURES 1, 2 and 3. As indicated schematically in FIGURE 7, the push rod 98 is connected through conventional linkage, as for example, a rocker pin 112 and a rocker cam 114 assembly, to stress against a valve stem 118. During operation of the engine the push rod acts, in the conventional manner, to overcome the pressure of the valve return spring 120 which is retained between a fixed wall 122 and a spring seat 124 keyed 126 on the valve stem 118, to open the valve.

The outer lifter 24 is reciprocably slidable in the block 20 of the engine and is generally cylindrical or tubular in form with an integral base 28 which, as previously described, rides upon the cam 14. Intermediate its opposed ends the cylindrical shell or wall 110 of the outer lifter 24 is provided with an annular groove 140 extending radially inwardly from the periphery of the wall 110 as seen most clearly in FIGURE 6. The annular grooved portion 140 of the lifter shell or wall 110 is provided with an opening or port or ports 144 extending through the wall of the outer lifter, the ports 144 communicating with an oil supply and return channed 150 and oil line 152 in the block 20. The other end of the port 144 communicates with the annular passage 106 formed between the body 52 of the inner lifter and the wall 110 of the outer lifter.

Coaxial with the shaft 56 of the inner lifter 32 and disposed circumferentially therearound in an elongated annular chamber 160 of the lifter assembly 12 is a novel spring 162 supported at its lower end on the base 28 of the outer lifter and abutting at its upper end and resiliently urging upwardly, at the lower surface of flange 50, the spool-like inner lifter 32 to bring the upper surface of the flange 48 into abutment against the ring key, or stop 36 retained in the annular recess 38 formed in the wall 110 of the outer lifter 24.

The spring 162 of the lifter assembly 12 is, as illustrated in FIGURES 1, 2 and 3, and as shown more clearly in FIGURES 4, 5 and 6, uniquely adapted for the purposes of the subject invention. As illustrated, the spring itself comprises a series of vertically stacked axially aligned cone-shaped spring washers 166 which encircle the lower shaft portion 56 of the inner lifter 32. The center openings 170 or holes through each of the spring washer elements 166 are aligned and are of a diameter which exceeds slightly the diameter of the shaft 56 projecting therethrough. The resulting spacing between the inner wall portion 172 of the spring elements 166 and the wall 176 of the inner lifter shaft 56 constitutes an annular passage through which oil or fluid (not shown) contained in the annular chamber 160 may pass. In the preferred embodiment of the invention illustrated, the spacing between the spring element or washer 166 and the shaft 56 of the inner lifter is about 1.5 mils.

The cone-shaped spring washers 166 are arranged in pairs to present, as seen most clearly in FIGURE 6, alternately upwardly and downwardly facing convex and concave surfaces 180 and 182. In this arrangement, a given spring element 166a interposed between two spring elements there adjacent 166b and 166c and contacting facing surfaces thereof engages a first spring element 166b at a corresponding hub portion 186 and a second spring element 186c at a corresponding peripheral portion 190. The conically shaped spring washers 166 are stamped from high strength metal sheet, and, in the particular arrangement described, are strongly resistant to axial compression.

As illustrated schematically in FIGURE 4, the spring washers 166 may be provided with a through hole 170 in the wall as an auxiliary means to facilitate passage of fluid between various portions of the annular chamber 160.

In FIGURES 1 through 3 the flanges 48 and 50 of the inner lifter 32 are illustrated schematically as being in sliding engagement with the inner surface 192 of the wall 110 of the outer lifter, and this is the actual structural arrangement. However, whereas the peripheral vertical wall 196 of the upper flange 48 is in substantial fluid-sealing engagement with its contacting wall 192, the peripheral vertical wall surface 200 of the flange 50 is critically spaced from the facing wall surface 192 of the outer lifter to permit controlled fluid passage therebetween. In the preferred embodiment of the invention illustrated the difference between the external diameter of the flange 50 and the internal diameter of the outer lifter 24 is in the range of from about ½ mil to about 4 mils, and preferably about 1½ mils. It will be readily apparent to those skilled in the art, with the present teachings before them, that in any given specific structure the actual wall clearance may vary and that diameter differences in the range from about ½ mil to about 3 mils or even more may be required in some cases. In an alternative arrangement the body 52 of the spool-like portion 42 of the inner lifter may be provided with a transverse port 204 providing controlled fluid communication between the annular chamber 106 and the slot or cavity 60 of the inner lifter 32.

As clearly illustrated in FIGURES 1, 2 and 3, the overall vertical length of the inner lifter 32 is somewhat less than the distance between the base wall 28 of the outer lifter and the facing surface of the stop ring 36 thus permitting a limited telescoping action of the inner lifter 32 within the outer lifter 24. In the preferred embodiment of the invention illustrated, the free space or height 210 available is about 0.07 inch, this height being correlated with the specific mode of valve actuation desired, as will become more evident as this description proceeds.

The operation of the variable valve timing mechanism shown in the embodiment of FIGURES 1, 2 and 3 is as follows: Referring first to FIGURE 2 which depicts the valve lifter 24 engaging the cam 14 at the heel portion 220, and considering first the case of low engine speed operation, with the parts positioned as illustrated in FIGURE 2, the pressure of the valve spring 120 transmitted to the inner lifter 32 is at a minimum and the opposing pressure of the stacked conical spring washers 162 is adequate to bias the inner lifter 32 to its upwardly extreme position against the stop ring 36. In this position the lower end 222 of the inner lifter 32 is spaced upwardly of the base or floor 28 of the outer lifter to provide free fluid communication between the internal cavity 60 within the inner lifter 32 and the annular cavity or chamber 160 between the inner and outer lifters.

As the cam shaft 16 rotates, the cam lobe 14 revolves, and as the high portion 224 engages the outer lifter, the lifter is forced upwardly. Concurrently, compressive force is applied to the stacked spring washers tending to move the inner lifter downwardly relative to the outer lifter as the outer lifter rises. Upon consideration of the structure described, it is readily apparent that in order for the inner lifter to move downwardly within the outer lifter from the position shown in FIGURE 2 to the position shown in FIGURE 1, fluid must be dispelled or released from the annular cavity or chamber 160 or from the cavity 60. The check valve assembly 72 and 76 prevents escape of fluid upwardly from the internal cavity 60 and, thus, any fluid which is dispelled escapes through the annular spacing 228 between respective facing vertical surfaces 200 and 192 of the flange 50 of the inner lifter and the cylindrical wall 110, of the outer lifter. As previously described, the clearance between these two faces is carefully controlled so that the annular passage 228 comprises a fluid control port and a finite pre-determined time is required to permit sufficient fluid to escape through this port so that the internal lifter 32 may move toward and bottom on the base wall 28 of the outer lifter, as shown in FIGURE 1. The parameters of the mechanical system described are such that at low engine speeds there is adequate time to permit the downward displacement of the inner lifter 32. However, at high engine speeds there is insufficient time, and thus the upward lifting or displacement of the push rod 98 at the high lobe portion of the camming cycle is less at low engine speeds than is the displacement at a corresponding portion of the cycle but at higher engine speeds.

That is, at high engine speeds and with the outer lifter riding on the heel portion 220 of the cam 14, the relative positioning of the internal or inner lifter 32 is the same as at low engine speeds and as illustrated schematically in FIGURE 2. However, at such engine speeds, as the cam rotates and the high lift portion 224 of the cam engages and pushes upwardly on the outer lifter, there is insufficient time to permit the discharge of appreciable fluid from the annular chamber 160 through the annular passage or duct 228. As a result, the inner lifter 32 remains in its upwardly displaced position and in substantial abutment against the stop ring 36 throughout the camming cycle. The significant practical effect at such high engine speeds is to lift the internal lifter 32 and its abutting push rod 98 earlier in the cycle and to a higher upper limit and to hold the valve 232 in an open position for a greater fraction of the camming cycle. At high engine speeds and associated high annular rotation of the cam shaft 16, the intake and exhaust valves of the engine will open "sooner" and close "later" than at low engine speeds, the fluid medium in the annular cavity 160 constituting a positive coupling or interlock between the inner and outer lifters at high engine speeds.

For purposes of illustrative disclosure, and not by way of limitation, a preferred cam contour is illustrated schematically in FIGURE 8 which also depicts the times of opening and closing of valves both for slow speed and for high speed engine operation. Recognizing that the cam shaft travels one r.p.m. for every two revolutions of the crank shaft, it is clear that in the preferred arrangement illustrated in FIGURE 8 that for low engine speed operation the intake and exhaust valves will open and close for 180 degrees in each position. At high engine speeds the valves will open sooner and close later, and in the preferred cam lobe illustrated, the valves will be open for a total of 278 degrees. Schematic FIGURE 8 represents intake valve operation; exhaust valve operation would be similar, but opposite in phase. In the high lift portion of the cam illustrated schematically in FIGURE 8, the outer line represents the actual physical limit of the mechanical cam, and comprises the effective cam contour at high engine speed. The dotted or phantom line symbolizes the effective cam contour at low engine speeds, that is, when there is sufficient time to permit fluid escape and to allow the inner lifter to move toward the base wall of the outer lifter. In the preferred system and cam described, the difference in the maximum lift is, as indicated in FIGURE 8, 0.063 inch. At intermediate engine speeds the "effective" cam lobe contour will fall in between the two limits illustrated in FIGURE 8. Under such conditions, the intake and exhaust valve timing cycle is a composite of the two extremes. Thus, in accordance with the practice of the present invention, it is possible to obtain, in a single engine and with a single cam lobe, the advantages of low speed and of high speed timing and of intermediate timing ensuring efficient engine operation at maximum speeds, at low speeds, and at intermediate speed ranges.

A second preferred embodiment of the invention is described herebelow with reference to FIGURES 9 through 14. Referring to the drawings, and particularly to FIGURES 9, 10, and 11, the second embodiment of the variable valve timing mechanism includes a double lifter assembly 312 which engages and bears upon the cam 14, the latter being fixed on the cam shaft 16 for rotation therewith.

The double lifter assembly 312, shown in detail in FIGURES 9 through 11 and illustrated in the exploded view, FIGURE 14, is slidably disposed for reciprocating action in the fixed body or block 20. As in the case of the first embodiment of the invention, the lifter assembly 312 includes a generally cylindrically shaped outer lifter 324 having a base wall or floor 328 which is normally supported on and rides on the cam 14. An inner lifter 332 is coaxial with and slidably supported within the outer lifter 324. A spring clip 336 (FIGURE 12) carried in an internal groove or recess 338 near the upper end of the outer lifter precludes inadvertent separation of the two principal elements of the lifter assembly.

The inner lifter 332, as seen most clearly in FIGURE 14, comprises a spool-like spindle 342 of generally cylindrical form and including axially spaced annular grooved or cut-out portions 344 and 346 defining axially spaced radial flanges 348, 350, and 352 integral with the body of the spool. Coaxial with the body of the inner lifter 332 at the base portion thereof is an off-set structure defining an annular neck 354, and a downwardly opening axial bore 356 extending through the base portion of the spindle 342 communicates at its upper end with a chamber or internal cavity 358, within the body of the spool 342.

At its lower port, the axial bore 356 abuts a check valve assembly 360 which includes a plate 366, a valve spring 372, and a housing or cannister 376. The cannister 376 is pressed onto and secured to the neck 354 of the spindle 342 so that the valve spring 372 is compressively contained and tensioned between the plate 366 and a base wall 378 of the cannister 376 to urge the plate 366 into pressure-responsive sealing engagement over the port 356 at the base of the inner lifter. The cannister 376 is provided with one or more slots or openings 380 permitting discharge of fluid from the chamber or cavity 358 within the inner lifter when fluid pressure applied downwardly against the plate 366 of the check valve exceeds the opposing force of the valve spring 372.

As seen most clearly in FIGURE 9, the inner lifter 332 is provided with an internal shoulder 384 which carries an oil feeding plate 386 having through oil passage openings 388. A plug or block 390 rests upon the plate 386 and retains the plate in position. The plug 390 is formed with a socket 392 extending axially inwardly of the top surface 394 of the lifter 332 for receiving the push rod 98 in supporting engagement. Lubrication at the rounded base 100 of the rod 98 is provided through a passage 396 in the plug 390, the passage communicating through an annular channel 398 and through plate openings 388 with the central cavity 358 in the inner lifter 332. Oil to the interior of the inner lifter 332 is provided through a port 402 in the sidewall 404 of the inner lifter, the port 402 communicating with an annular passage 406 formed between the wall 404 of the inner lifter and the facing side wall 410 of the outer lifter, as shown in FIGURES 9, 10 and 11.

Intermediate its opposed ends the cylindrical shell or wall 410 of the outer lifter 324 is provided with an annular groove 436 extending radially inwardly of the periphery of the wall 410, as seen most clearly in FIGURE 14. The annularly grooved portion of the lifter wall 410 is provided with one or more through ports 440 communicating with the oil supply and return channel 150 and oil line 152 in the block 20. At its other end, the port 440 communicates with the annular passage 406 formed between the inner and the outer lifter. Axially downwardly from the groove 436, the outer lifter 324 is provided, on its inner wall surface with an annular groove 444 extending radially outwardly of the principal inner wall surface 446 of the outer lifter, angled shoulders 450 and 452 being provided at respective upper and lower extremities of the grooved portion 444. At its base portion 454, the wall 446 of the outer lifter is off-set inwardly to provide in the bottom of the outer lifter a cavity or chamber 456 of somewhat reduced diameter as compared with the principal chamber 458 of the lifter 324. A spring 462, coaxial with the inner lifter 332 rests upon the floor 466 of the chamber 456 and extends upwardly and about the cannister 376 housing the check valve assembly 360 to abut against a laterally extending flange 470 of the cannister, thereby urging the inner lifter 332 resiliently upwardly.

As indicated schematically in FIGURES 9 through 11, and as shown most clearly in FIGURE 10, the outer wall surfaces of the upper and lower flanges 348 and 352 of the inner lifter are in substantially fluid sealing and sliding engagement with corresponding inner principal wall surfaces 480 and 446 of the outer lifter 324. The outer surface 484 of the intermediate flanged portion 350 of the inner lifter 332 is also, over a major portion of its expanse, in sliding and substantially fluid sealing engagement with a corresponding intermediate principal wall portion 488 of the outer lifter 324. However, as seen most clearly in FIGURE 13, longitudinally extending surface portions 492 of the inner lifter 332 are cut away to provide fluid passages 504 between the facing walls of the inner and outer lifters, these passages communicating between the longitudinally spaced grooves 344 and 346 of the inner lifter 332 and between the corresponding annular passages 406 and 496 between the inner and outer lifters.

The operation of the second preferred variable valve timing mechanisms is described below with reference to FIGURES 9, 10 and 11. Referring first to FIGURE 9 which depicts the valve lifter 324 engaging the cam 14 at its heel portion 220, and considering first the case of low engine speed operation with the parts positioned as illustrated in FIGURE 9, the pressure of the valve spring 120 (FIGURE 7) transmitted to the inner lifter 332 is at a minimum and the opposing pressure of the return spring 462 is adequate to force the inner lifter 332 to its upwardly extreme position. As the inner lifter 332 moves upwardly with respect to the base 328 of the outer lifter 324, the check valve plate 366 is unseated and oil supplied through the line 150 to the interior 358 of the inner lifter 332 enters the chambers 456 and 458. With the inner lifter 332 at its upwardly displaced position, the lower end of the lowermost flange 352 of the inner lifter 332 is upwardly of the lower sidewall portion 480 of the outer lifter 324 so that fluid may pass freely from the principal chamber 458 of the outer lifter to the annular passage 406 through the intermediate, connecting annular passages 496 and 504.

As the cam shaft 16 rotates and the cam lobe 14 revolves, the high portion 224 engages the outer lifter and forces it upwardly, as shown in FIGURE 10. Concurrently, compressive forces are applied to the spring 462 as the inner lifter tends to move downwardly relative to the outer lifter. As previously explained with respect to the operation of the first embodiment of the invention, it will be apparent that in order for the inner lifter to move "downwardly" within the outer lifter from the position shown in FIGURE 9 to the position shown in FIGURE 10, fluid must be dispelled or discharged from the chambers 458 and 456 extending generally below the horizontally extending wall 508 of the inner lifter 332. Since the axial passage 356 communicating with the internal cavity 358 of the inner lifter is effectively blocked at its lower end by the check valve plate 366, any fluid to be dispelled from the cavities 458 and 456 must escape through the annular spacing between respective facing vertically extending wall surfaces of the inner and outer lifters. As previously described, the inner lifter 332 is cut away at its body portion comprising the middle flange 350 to provide fluid passage means 504 between the two lifters. The cross sectional area of these passages is carefully controlled, and in the particular embodiment of the invention illustrated, the over-all lateral width of the flange 350 is about 0.003 inch less than the internal transverse diameter of the outer lifter.

In the light of the present disclosure it will be evident to those skilled in the art that different porting cross sections will be required in different embodiments of the invention. Since the passages 504 constitute restrictions to unrestrained free flow of fluid, a finite predetermined time is required for a given volume of fluid to escape through the passages as the internal lifter 332 moves toward the base 328 of the outer lifter 324.

The parameters of the mechanical system described are such that at low engine speeds there is adequate time for fluid escape through the passage 504, permitting a significant downward displacement of the inner lifter 332. However, at high engine speeds the time for fluid escape is reduced appreciably. Thus, the upward lifting or displacement of the push rod 98 at the high lobe portion of the camming cycle is less at low engine speeds than at higher engine speeds. That is, at high engine speeds and with the outer lifter riding on the heel portion 220 of the cam 14, the relative positions of the inner and outer lifters are the same as at low engine speeds, and as illustrated schematically in FIGURE 9. However, at these high engine speeds as the cam rotates and the high lift portion 224 of the cam engages and pushes upwardly on the outer lifter, there is insufficient time to permit the discharge of appreciable fluid from the chambers 458 and 456 through the linear passage 504. As a result, the inner lifter 332 remains "fluidly locked" in its upwardly displaced position relative to the outer lifter, as shown in FIGURE 11, the practical effect being to lift the internal lifter 332 and the abutting push rod 98 earlier in the cycle and to a higher upper limit and to hold the valve 232 in an open position for a greater fraction of the camming cycle. From the foregoing description it will be apparent that at high engine speeds and associated high annular rotation of the cam shaft 16, the intake and exhaust valves of the engine will open "sooner" and close "later" than at low engine speeds, the fluid medium in the chambers 458 and 456 constituting a positive coupling or interlock between the inner and outer lifters at such high engine speeds.

Under operating conditions in which the inner lifter 332 moves downwardly relative to the outer lifter 324, the lower flange 352, at its side wall surfaces, comes into close fitting and sliding engagement with the lower sidewall surface 506 of the outer lifter whereby discharge or escape of oil from the chambers 458 and 456 is highly restricted, the transverse diameter of the flange 352 being only of the order of about 0.001 to 0.0015 inch less than the internal or inside diameter of the outer lifter as measured at the corresponding principal wall surface. The limited fluid flow through the annular passage effects a hydraulic cushioning, preventing mechanical bottoming and obviating shock which would result from any abrupt complete blockage of telescoping travel of the inner lifter downwardly in the outer lifter.

While preferred commercial embodiments of the novel variable valve timing mechanism of the invention have been illustrated and described, it is understood that the same is capable of modification and that such modifications may be made without departure from the spirit and scope of the invention as defined in the appended claims.

What is claimed is:

1. An engine-speed-controlled cam-actuated automatically variable mechanism for opening valves of an internal combustion engine and comprising:
   a single-lobe cam having a cam surface,
   a fixed body having a fluid supply passage,
   a pair of fluid-coupled lifters arranged within said body in coaxial sliding engagement and having portions disposed for relative telescopic axial movement,
   said lifters comprising an outer lifter abutting and following said cam surface and an inner lifter in an out-of-contact relation with said cam surface and engaging a push rod for opening a valve of an engine,
   said lifters defining therebetween a chamber adapted to contain a body of fluid comprising fluid means coupling one of said lifters to the other,
   a wall of said outer lifter having through fluid inlet means communicating with said fluid supply passage in said fixed body,
   passage means connecting said fluid inlet means to said chamber for introduction of fluid thereto,
   porting means for controlling the rate of discharge of fluid from said chamber during axial displacement of said lifters relative to one another and for controlling the degree to which axial reciprocal movement of said inner lifter coincides with and duplicates axial reciprocal movement of said outer lifter on said cam, the degree of fluid coupling of said lifters being thereby a function of linear displacement velocity of said outer lifter in response to cam action thereagainst, and
   spring means urging one end of said inner lifter against said push rod and biasing an opposite end of said inner lifter to an out-of-contact position with respect to a base wall of said outer lifter.

2. The structure as set forth in claim 1 wherein said spring means is disposed in said chamber between said inner and said outer lifters and is axially confined between said base wall of said outer lifter and a laterally extending flange of said inner lifter displaced axially of said base wall of said outer lifter and extending generally parallel thereto.

3. The structure as set forth in claim 1 wherein said spring means comprises a series of in-line cone-shaped spring washers stacked vertically and encircling said inner lifter and coaxially disposed with respect thereto, pairs of said stacked washers comprising cooperating first and second spring elements presenting alternately upwardly and downwardly facing convex and concave surfaces.

4. The mechanism as set forth in claim 3 wherein a given spring element is interposed between two spring elements there adjacent and contacts facing surfaces thereof, said given spring element engaging a first of said two spring elements at a corresponding hub portion thereof and a second of said two spring elements at a corresponding peripheral portion thereof.

5. The mechanism as set forth in claim 1 wherein said chamber between said outer and inner lifters comprises an annular cavity of variable volume and wherein said inner lifter has an open-ended hollow core communicating with said chamber.

6. The mechanism as set forth in claim 5 and further comprising check valve means in said core of said inner lifter at one end thereof, said check valve means comprising unidirectional flow fluid passage means communicating between said fluid inlet means and said core,
   said check valve means permitting therethrough inflow of hydraulic fluid into said hollow core and preventing discharge of fluid therefrom during relative reciprocal axial movement between said lifters during operation of said mechanism.

7. The mechanism as set forth in claim 1 wherein said porting means for controlling the rate of discharge of said fluid from said chamber limits the rate of fluid discharge from said chamber during movement of said inner lifter downwardly with respect to said outer lifter, said porting means comprising an annular passage formed by a limited physical separation of corresponding facing vertical wall surfaces of said inner and said outer lifters.

8. The mechanism as set forth in claim 7 wherein said physical separation between said wall surfaces is from about ¼ mil to about 2 mils.

9. The structure of claim 1 wherein said inner lifter is of a spool-like configuration adapted for reciprocal axial sliding movement in said outer lifter and including a cylindrical body of a diameter less than the internal diameter of said outer lifter to define an annular cavity between said body and said outer lifter, a pair of vertically spaced flanges integral with said body and spaced axially therealong and extending radially thereof to define substantially coplanar upper and lower vertical guide surfaces,
   each said flanges having a peripheral configuration corresponding essentially to the internal cross-sectional contour of said outer lifter whereby said guide surfaces are substantially bearing surfaces during reciprocal movement of said inner lifter within said outer lifter,
   a lower one of said flanges being of a diameter in the range from about ½ mil to about 4 mils less than the inner diameter of said outer lifter to permit limited fluid flow between said inner and outer lifters during relative downward movement of said inner within said outer lifter and concurrent exhaust of fluid into said annular cavity between said body of said inner lifter and said outer lifter.

10. The structure as set forth in claim 9 wherein said inner lifter further comprises an integral coaxial shaft extending axially of said cylindrical body and projecting downwardly of said pair of flanges and coaxially of said outer lifter to define between said shaft and said outer lifter the said chamber in which said spring means is disposed, a free end of said shift approaching proximate a base wall of said outer lifter during downward travel of said inner lifter within said outer lifter as said cam urges said outer lifter upwardly during engine operation, said end of said shaft abutting said base wall of said outer lifter as a limit of said downward travel of said inner lifter within said outer lifter.

11. The structure as set forth in claim 1 wherein fluid contained in said chamber between said lifters comprises means precluding downward movement of said inner lifter within said outer lifter in the absence of fluid escape from said chamber, said downward movement occurring only to the extent that fluid is dispelled from said chamber through said porting means, said porting means comprising a restricted annular duct between adjacent coextensive wall portions of said inner and said outer lifters and communicating between said chamber and said fluid supply passage.

12. The structure as set forth in claim 1 wherein said spring means is strongly resistant to and opposes axial compression and comprises an opposing structural element to be overcome during relative downward movement of said inner lifter within said outer lifter as said outer lifter engages a high-lift portion of said cam, and wherein
said porting means comprises fluid flow limiting means regulating fluid discharge from said chamber and precluding rapid relative downward movement of said inner lifter within said outer lifter and toward a base wall thereof as said outer lifter engages said high lift portion of said cam,
bottoming of said inner lifter within said outer lifter being achieved only at low cam rotation speeds and at corresponding low engine speeds, and said spring means being effective rapidly to force said inner lifter to an upper limit position when said lower lifter engages a low-lift portion of said cam;
whereby said mechanism automatically provides smaller cycle fractions of valve opening at lower engine speeds and larger cycle fractions of valve opening at higher engine speeds thereby effecting earlier opening and later closing of intake and exhaust valves at higher engine speeds and later opening and earlier closing of said valves at lower engine speeds.

13. The structure as set forth in claim 1 and further comprising a retainer ring carried by and projecting radially inwardly of a vertical wall of said outer lifter at an upper portion thereof, said ring constituting mechanical stop means limiting upward travel of said inner lifter within said outer lifter in response to spring pressure urging said inner lifter upwardly of a base of said outer lifter,
longitudinal expanse between said ring and said base exceeding the overall length of said inner lifter by about 0.07 inch thereby to limit relative upward travel of said inner lifter within said outer lifter to about 0.07 inch.

14. The mechanism as set forth in claim 1 wherein said porting means regulating volume rate of fluid discharged from said chamber during cam action against said outer lifter limits volume rate of fluid exhaust from said chamber, volume of fluid exhaust from said chamber as a function of time varying inversely as the angular velocity of said cam shaft and cam lobe during operation of said engine, whereby, at slow engine speeds, input to and exhaust of fluid from said chamber permits reciprocal movement of said inner lifter within said outer lifter, while at high engine speeds, time lag and restricted fluid discharge from said chamber through said porting means preclude independent movement of said outer and inner lifters and establish a degree of fluid coupling, engagement and interlocking between said lifters,
said degree of coupling, engagement and interlocking being proportional to and increasing with engine speed.

15. The mechanism as set forth in claim 1 wherein said fluid porting means includes fluid gating means comprising an aperture between walls of said inner and said outer lifters and defining a fluid passage zone of a variable cross-sectional area, said area being correlated with relative axial positions assumed by said inner and said outer lifters during said axial displacement of said lifters relative to one another.

16. The mechanism as set forth in claim 15 wherein said fluid gating means includes channel means comprising a duct formed between and extending longitudinally along opposed facing walls of said inner and said outer lifters, said duct extending between and connecting said aperture with said fluid inlet means in said wall of said outer lifter.

17. The mechanism as set forth in claim 1 wherein said chamber between said inner and outer lifters comprises a cavity of variable volume and wherein said inner lifter is formed with an open-ended axially extending hollow core communicating with said chamber and with said fluid inlet means.

18. The mechanism as set forth in claim 17, and further comprising check valve means in series between the open end of said core of said inner lifter and said chamber, said check valve means comprising unidirectional fluid flow control means communicating between said core and said chamber.

19. The mechanism as set forth in claim 18, wherein said check valve mean includes cooperating port means, port-blocking means, and spring means oriented to permit unidirectional flow of fluid from said core into said chamber and to preclude reverse flow of fluid from said chamber to said core during relative reciprocal axial movement of said lifters during operation of said mechanism.

20. The structure as set forth in claim 15 and further comprising a generally horizontally disposed annular groove formed between facing wall surfaces of said inner and outer lifters and encircling said inner lifter at a position axially intermediate said aperture and said fluid inlet means to define an annular fluid collecting reservoir.

21. The structure as set forth in claim 20 and further comprising generally vertically extending annular fluid passage means communicating between said aperture and said annular groove to facilitate fluid passage therebetween.

22. The structure as set forth in claim 20 wherein one of said inner and said outer lifters is formed to provide longitudinally along a vertically extending wall surface thereof a cut away portion establishing an elongated slot extending between said lifters at contiguous surfaces thereof and longitudinally therealong, said slot constituting fluid passage means between said fluid collecting reservoir and said fluid inlet means.

23. The mechanism as set forth in claim 1 wherein said passage means includes an elongated slot extending between said lifters at facing surfaces thereof and longitudinally therealong, said slot constituting duct means for discharge of fluid from said chamber to said fluid supply passage as said inner lifter moves axially downwardly within said outer lifter.

24. The mechanism as set forth in claim 1 and including fluid flow restriction means comprising substantially contiguous cooperating wall surface portions of said inner and said outer lifters, and constituting fluid flow limiting means controlling the rate of discharge of fluid from said chamber as said inner lifter moves downwardly within said outer lifter and effective to prevent mechanical bottoming of said inner lifter within said outer lifter and to prevent associated noise of metal-to-metal contact.

References Cited

UNITED STATES PATENTS

| | | | |
|---|---|---|---|
| 2,220,336 | 11/1940 | Johnson et al. | 123—90 |
| 2,484,109 | 10/1949 | Meinecke | 123—90 |
| 2,614,547 | 10/1952 | Meinecke | 123—90 |
| 2,791,993 | 5/1957 | Hubbard et al. | 123—90 |
| 2,947,296 | 8/1960 | Skinner | 123—90 |
| 3,177,857 | 4/1965 | Kuchen et al. | 123—90 |

AL LAWRENCE SMITH, *Primary Examiner.*